United States Patent [19]
Hasegawa

[11] Patent Number: 5,995,808
[45] Date of Patent: Nov. 30, 1999

[54] RADIO SELECTIVE CALL RECEIVER SUCH AS A PAGER AND METHOD OF DISPLAYING REMAINING TIME ALLOWED FOR DATA RETENTION AFTER REMOVAL OF A BATTERY

[75] Inventor: Kazuhiko Hasegawa, Shizuoka, Japan

[73] Assignee: NEC Corporation, Japan

[21] Appl. No.: 08/881,982

[22] Filed: Jun. 25, 1997

[30] Foreign Application Priority Data

Jun. 25, 1996 [JP] Japan ................................. 8-164257

[51] Int. Cl.⁶ ..................................................... H04B 17/00
[52] U.S. Cl. ........................ 455/67.7; 455/38.4; 455/572
[58] Field of Search ................................ 455/38.3, 38.4, 455/67.7, 226.1, 226.4, 572, 575, 90, 343, 127, 574; 340/825.44, 311.1

[56] References Cited

U.S. PATENT DOCUMENTS

| | | | |
|---|---|---|---|
| 4,940,975 | 7/1990 | Ide et al. ................................. | 455/343 |
| 5,438,695 | 8/1995 | Morimura et al. ...................... | 455/572 |
| 5,524,021 | 6/1996 | Scotton et al. .......................... | 455/38.3 |
| 5,551,077 | 8/1996 | Oda ......................................... | 455/572 |
| 5,608,612 | 9/1995 | Hokao ..................................... | 455/575 |
| 5,858,570 | 1/1999 | Akagi ....................................... | 455/90 |

FOREIGN PATENT DOCUMENTS 5-110495  4/1993  Japan .

*Primary Examiner*—Dwayne D. Bost
*Assistant Examiner*—Quochien B. Vuong
*Attorney, Agent, or Firm*—Ostrolenk, Faber, Gerb & Soffen, LLP

[57] ABSTRACT

A radio selective call receiver such as a pager that displays a remaining time for retaining data stored in a memory of the receiver on its LCD after removing the battery, providing a user with an easy and simple way of protecting for data. A count section of a decoder circuit counts the time period elapsing from removal of the battery to insertion of a replacement battery detected by a battery removal/insertion detection circuit using a reference clock. An operation section reads a message retentive time from a ID-ROM indicating the time allowed for retaining the message preset in the RAM after removing the battery and outputs an operation result obtained by subtracting the elapsed time from the message retentive time. A CPU receives output information of the operation section 6c and edits the output information conforming to the remaining time for retaining the message so as to be displayed on the LCD 8.

16 Claims, 3 Drawing Sheets

RADIO SELECTIVE CALL RECEIVER SUCH AS A PAGER AND METHOD OF DISPLAYING REMAINING TIME ALLOWED FOR DATA RETENTION AFTER REMOVAL OF A BATTERY

BACKGROUND OF THE INVENTION

The present invention relates to a radio selective call receiver such as a pager and, more particularly, to one with a circuit for preventing data loss when replacing a battery.

The conventional radio selective call receiver of the above type is designed to allow for appropriate battery replacement in order to prevent suspension of reception operation as well as making full use of the battery. For example, JP-A110495/1993 relates to a receiver comprising low voltage detection means for detecting the battery voltage decline below a predetermined reference voltage, alarm means for providing a first alarm in response to a low voltage detection signal sent from the low voltage detection means and low voltage elapsed time display means for displaying the time elapsed from the first alarm to the present time so that the battery can be replaced at an appropriate time.

The above-described conventional radio selective call receiver displays the time elapsed from the first alarm indicating a low voltage condition to the present time on its display unit, calling for a user carrying the receiver (hereinafter referred to as a user) to replace the battery upon seeing the displayed elapsed time and gives a second alarm to notify the user if the battery has not been replaced yet after a predetermined time has passed. From the displayed elapsed time after the first alarm however, the user is not able to obtain information as to how much of the capacity of the battery is left to retain the data stored in a memory of the second receiver. As the alarm operation is likely to consume more power of the battery compared with the LCD display operation, the second alarm decreases the effective service life of the battery in use.

SUMMARY OF THE INVENTION

It is an objective of the present invention to provide a radio selective call receiver that displays a remaining time allowed for retaining the data stored in the receiver memory on an LCD after removal of the battery so as to prevent loss of such data.

The objective of the present invention is attained by a radio selective call receiver comprising display means; detection means for detecting removal/insertion of a battery; count means for counting a time period elapsing from removal of a battery to insertion of a replacement battery detected by the detection means; memory means for storing a data retentive time allowed to retain data stored in a RAM after removing the battery; operation means for subtracting the elapsed time period from the data retentive time and outputting an operation result; and control means for displaying a remaining time allowed for retaining the data stored in a RAM based on the operation result.

In the present invention, a retentive time allowed for retaining data stored in a RAM after removing the battery is preset. Removal of the battery is detected and the time period elapsing from the detection is counted. The counted time is subtracted from the retentive time to obtain a remaining time allowed for battery replacement for retaining the data and is displayed.

BRIEF DESCRIPTION OF THE DRAWINGS

This and other objectives, features and advantages of the present invention will become more apparent upon a reading of the following detailed description and drawings, in which.

DESCRIPTION OF PREFERRED EMBODIMENTS

Figure 1:
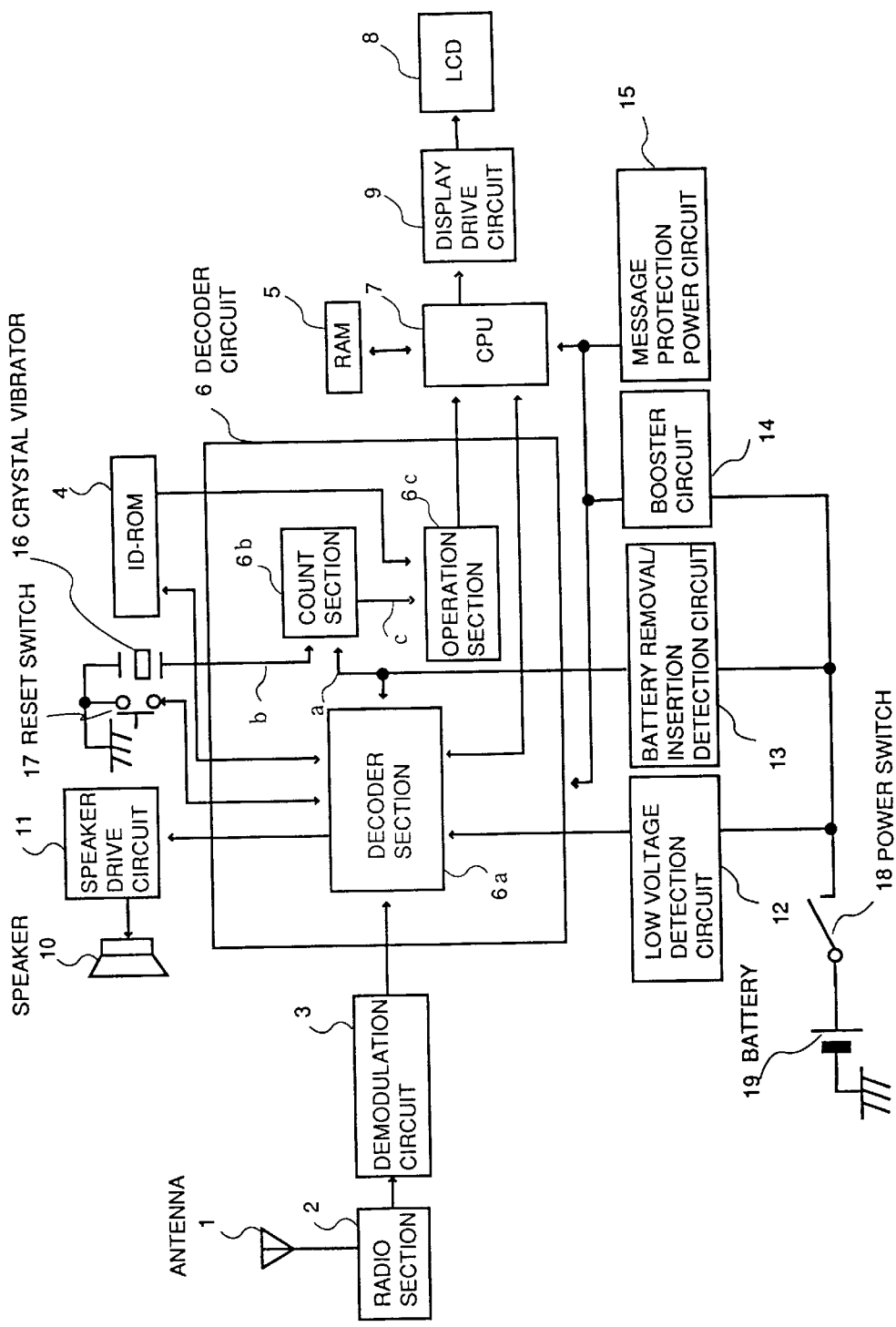
FIG. 1 is a block diagram of an embodiment of the present invention.

An Embodiment of the present invention is described referring to the drawings.

FIG. 1 is a block diagram of a radio selective call receiver such as a pager according to an embodiment of the present invention.

Referring to FIG. 1, a reference numeral 1 is an antenna and reference numeral 2 is a radio section for receiving a radio signal such as a page sent from a transmission station via the antenna 1. A reference numeral 3 is a demodulation circuit for demodulating the received radio signal. A reference numeral 4 is an ID-ROM 4 for presetting a present call number. A reference numeral 5 is a RAM for storing received message data together with the data reception time. A reference numeral 6 is a decoder circuit comprising a decoder section 6a for reading the present call number preset in the ID-ROM 4 through converting the received data, comparing the call number with a call number contained in the received radio signal and alarming when both call numbers coincide with each other. A reference numeral 7 is a CPU for controlling to display responding to an instruction of the decoder circuit 6. A reference numeral 8 is an LCD for displaying output information of the CPU 7. A reference numeral 9 is a display drive circuit 9 for controlling to drive the LCD 8.

A reference numeral 10 is a speaker that alerts in response to an instruction of the decoder section 6a. Reference numeral 11 is a speaker drive circuit 11 for controlling to drive the speaker 10.

A reference numeral 12 is a low voltage detection circuit 12 for notifying the decoder section 6a of a detected condition that the voltage of a battery 19 for supplying power to each inner circuit has declined below a predetermined reference voltage. A reference numeral 13 is a battery removal/insertion detection circuit 13 for detecting removal/insertion of the battery 19. A reference numeral 14 is a booster circuit for supplying power to the decoder circuit 6 and the CPU 7. A reference numeral 15 is a message protection power supply circuit for supplying backup power for a predetermined time period to protect message data stored in the RAM 5 during battery replacement.

A reference numeral 16 is a crystal vibrator for generating a reference clock signal. A reference numeral 17 is a reset switch that causes the speaker 10 to stop alarming or displays the message data stored in the RAM 5. A reference numeral 18 is a power switch 18 for connecting/disconnecting power supply to the respective circuits of the receiver.

The decoder circuit 6 further comprises a count section 6b and an operation section 6c. The count section 6b counts the time period elapsing from removal of the battery 19 to insertion of a replacement battery detected by the battery removal/insertion detection circuit 13 using a reference clock. The operation section 6c reads a data retentive time, i.e. the time allowed for retaining the message data stored in the RAM 5 after removing the battery 19, from data preset in the ID-ROM 4 and outputting an operation result obtained by subtracting the elapsed time period from the data retentive time.

The CPU 7 has a function for editing output information received from the operation section 6c conforming to the remaining time allowed for retaining the message data.

An operation of the embodiment according to the present invention is described referring to FIGS. 1 to 5. A radio section 2 receives a radio signal transmitted from a transmission station via an antenna 1. The radio signal is further transmitted to a demodulation circuit 3 for demodulation and sent to a decoder section 6a of a decoder circuit 6. The decoder section 6a reads a present ID (call number information) that has been preset in an ID-ROM 4, which is compared with the ID contained in the radio signal. When it is determined that both IDs coincide with each other, the decoder section 6a judges that a call has been received and then transmits a call notification signal to a speaker drive circuit 11. The speaker drive circuit 11 sends a call sound signal to a speaker 10 for outputting alarms.

A message code displayed on a receiver can be contained in the aforementioned radio signal. When the radio signal contains the message data, the decoder section 6a error corrects and decodes the message data and then transmits the decoded message data to a display drive circuit 9 via a CPU 7. The display drive circuit 9 generates display pattern data corresponding to the message data and drives LCD 8 to display the message based thereon. The message data are stored in the RAM 5 together with the data reception time.

A battery 19 is used as a power source. A power switch 18 connects/disconnects power supply to the respective circuits of the receiver. A reset switch 17 is used for suspending alarms or displaying messages stored in the RAM 5. A crystal vibrator 16 is formed as a vibrator for generating a clock that operates the decoder circuit 6.

A low voltage detection circuit 12 detects the condition that the power voltage declines below the voltage for operating the radio section 2 stably (hereinafter referred to as LVA voltage) and notifies the decoder section 6a of this condition. The decoder section 6a alerts the speaker 10 with sounds different from a normal call sound via the speaker drive circuit 11. The sound for alarming the low voltage continues until the user confirms and takes the power switch 18 off. The above-described alarming calls upon the user to replace the battery. The LVA voltage is normally set to approximately 1.1 volt to prevent sensitivity deterioration.

A message protection power circuit 15 is provided in order to prevent content of the message stored in the RAM 5 from being cleared when replacing the battery. A booster circuit 14 conventionally comprising a DC/DC converter supplies power to controlling circuits such as the decoder circuit 6, CPU 7 and the like. When the user replaces the battery, a battery removal/insertion detection circuit 13 detects removal of the battery 19 and notifies the decoder section 6a of the removal state. Subsequently the message protection power circuit 15 starts supplying power to the above controlling circuits.

The message protection power circuit 15 starts charging a backup battery (not shown) comprising a capacitor with high capacity keeping its reception function effective at a moment when the user inserts the battery 19. The charging is continued until the voltage becomes equivalent to an output voltage of the booster circuit 14. When the battery 19 is removed after LVA alarming, the message protection power circuit 15 starts supplying power to the decoder circuit 6 and the CPU 7. The stored message can be protected at a minimum voltage allowing the controlling circuits such as the decoder circuit 6 and CPU 7 to operate with the aid of discharge characteristics of the backup battery.

Figure 2:
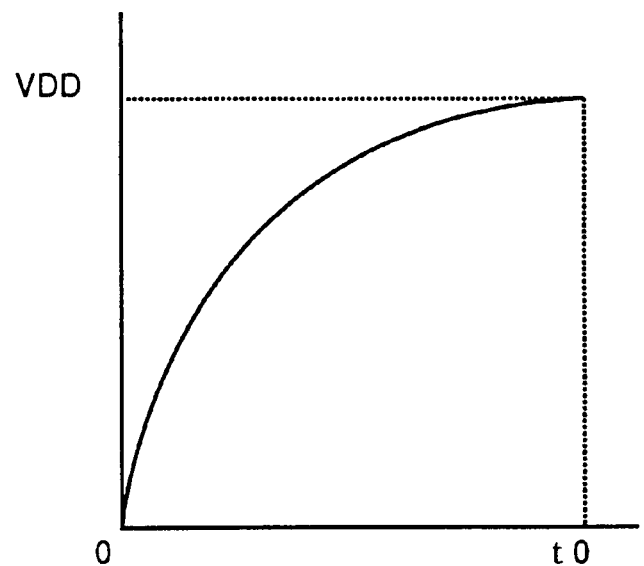
FIG. 2 is a view explaining charge characteristics of a message protection power circuit.

FIG. 2 is a graphical representation of discharge characteristics of the message protection power circuit. Referring to FIG. 2, at the time t=0, the user has inserted the battery 19. At the time t=t0, the voltage becomes equivalent to the output voltage VDD of the booster circuit 14 and charging is completed.

Figure 3:
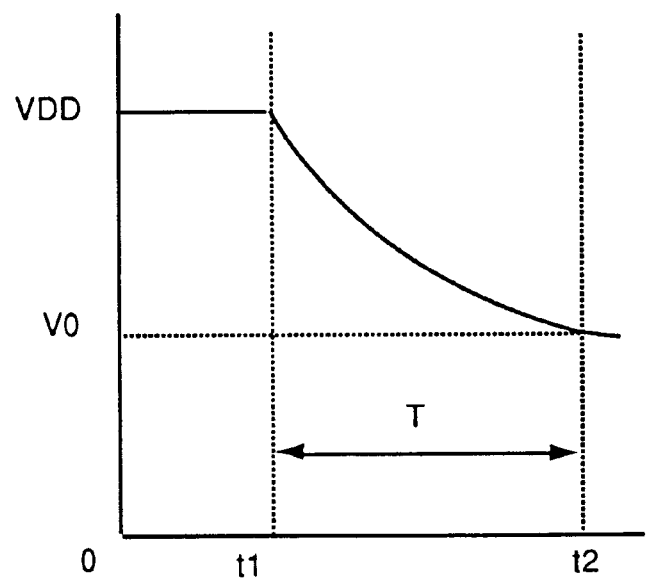
FIG. 3 is a view explaining discharge characteristics of the message protection power circuit.

FIG. 3 is a graphical representation of discharge characteristics of the message protection power circuit. Referring to FIG. 3, at the time t=t1, the user has removed the battery 19 and at the time t=t2, message data are no longer protected. At this point, the voltage becomes V0 where the decoder circuit 6 and the CPU 7 cannot be operated. The time t=t2−t1 represents the time period allowed for protecting the memory. Therefore the message retentive time should be obtained and stored in the ID-ROM 4 considering the worst conditions of unevenness in parts such as a capacitor, resistance, diode or the like forming the backup battery or unevenness in voltage of the booster circuit 14.

Figure 4:
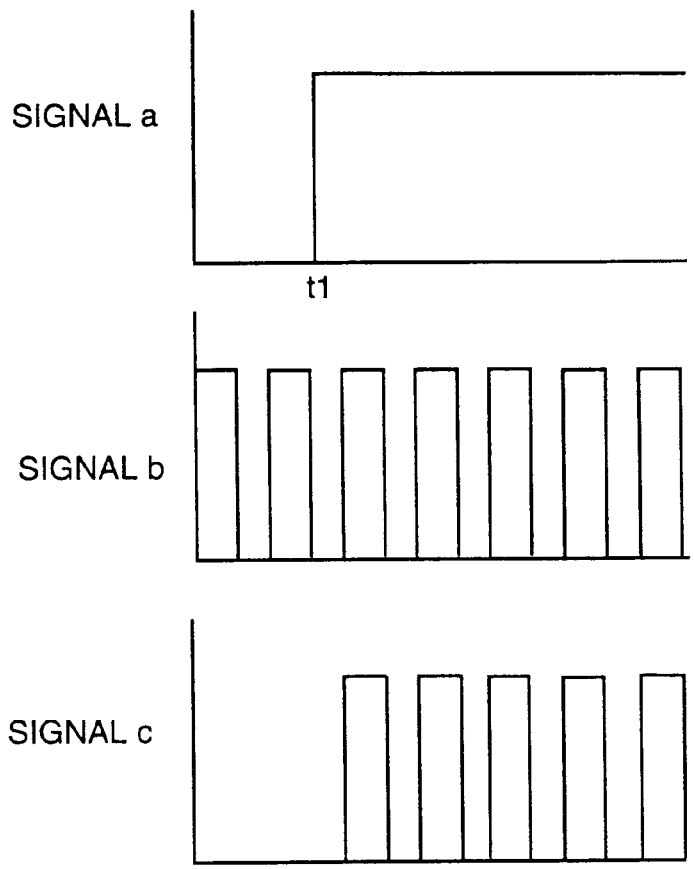
FIG. 4 is a view explaining a signal input/output to a count section of a decoder circuit.

FIG. 4 is a graphical representation of a signal input/output to the count section 6b. Referring to FIG. 4, when the user removes the battery 19, a transistor (not shown) provided in the battery removal/insertion detection circuit 13 is switched from On to Off. Accordingly a signal $a$ reverses its logic from L level to H level, thus switching the power source for supplying power to the controlling circuits from the booster circuit 14 to the message protection power circuit 15. From the above time point, a reference clock signal from the crystal vibrator 16 is converted into a signal $b$ of 1 second pulse through dividing circuit (not shown) of the decoder circuit 6 and input to the count section 6b to start counting.

Figure 5:
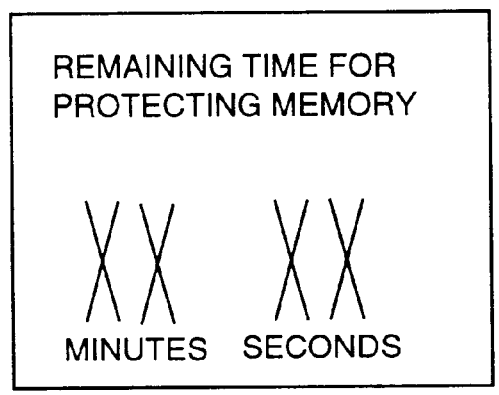
FIG. 5 is a view showing an example of an LCD display.

The count section 6b inputs 1 second pulse signal $c$ to the operation section 6c from the time when counting has started until a replacement battery is inserted. More specifically the count section 6b counts the time elapsing from removal of the battery 19 to insertion of the replacement battery using the reference clock signal. The operation section 6c reads a message retentive time T preset in the ID-ROM 4 and subtracts a value received from the count section 6b from the message retentive time T. The CPU 7 receives the data and edits the received output information conforming to the remaining time allowed for retaining the data and drives a display drive circuit 9 so that an LCD 8 displays the remaining time for protecting the memory, for example, in minutes and seconds as shown in FIG. 5.

Operation of the operation section 6c is initialized when the replacement battery is inserted. The display is reset to its original condition.

Assuming that 10 minutes is left for the message retentive time, the CPU 7 can be so constructed to control to display the remaining time only in minutes until the time reaches 5 minutes so that the user can see the display easily and power consumption is kept as low as possible. After the remaining time reaches 5 minutes, the subsequent time is displayed both in minutes and seconds.

In the radio selective call receiver with a display provided with the battery removal/insertion detection circuit for detecting removal/insertion of the battery, the decoder circuit comprises a count section for counting the time period elapsing from removal of the battery to insertion of the replacement battery detected by the battery removal/ insertion detection circuit using the reference clock and an operation section for reading data retentive time representing the time allowed for retaining the data stored in the RAM when removing the battery from an ID-ROM and outputting an operation result obtained by subtracting the counted elapsed time from the data retentive time. The CPU receives the output information of the operation section that is edited conforming to the remaining time allowed for retaining the data so as to be displayed on the LCD. After the battery is removed, the LCD displays the remaining time allowed for retaining the data stored in the memory of the receiver so as to call for the user to protect the data, resulting in easier manipulation.

The entire disclosure of Japanese Patent Application No. 8-164257 filed on Jun. 25, 1996 including specification, claims, drawing and summary is incorporated herein by reference in its entirety.

What is claimed is:

1. A radio selective call receiver comprising:

display means;

detection means for detecting removal/insertion of a battery;

count means for counting a time period elapsing from removal of a battery detected by said detection means;

a RAM for storing message data;

backup power supply means for supplying power to said RAM when said battery has been removed, for retaining said message data in said RAM;

memory means for storing a data retentive time during which said backup power supply means can retain said message data stored in said RAM after removal of said battery and before said battery has been replaced;

operation means for subtracting said elapsed time period from said data retentive time and outputting an operation result; and control means for displaying a remaining time allowed for retaining said data stored in a RAM based on said operation result.

2. The radio selective call receiver of claim 1, wherein said control means comprises means for displaying a remaining time only in minutes.

3. The radio selective call receiver of claim 1, wherein said control means comprises means for displaying a remaining time both in minutes and seconds.

4. The radio selective call receiver of claim 1, wherein said control means comprises means for displaying a remaining time only in minutes until a predetermined time and displaying a subsequent time of said remaining time both in minutes and seconds.

5. A radio selective call receiver comprising:

an LCD;

a decoder circuit for reading a present call number preset in an ID-ROM, comparing a call signal of said present call number with a call signal contained in a received radio signal and alarming when both of said call numbers coincide with each other;

a low voltage detection circuit for detecting a condition that a voltage of a battery supplying power to each inner circuit declines below a predetermined reference voltage and notifying said decoder circuit of said detected condition;

a CPU for controlling display on said LCD in response to an instruction of said decoder circuit;

a battery removal/insertion detection circuit for detecting removal/insertion of a battery;

a RAM for storing message data; and a backup power supply for supplying power to said RAM when said battery has been removed, for retaining said message data in said RAM; wherein said ID-ROM stores a data retentive time during which said backup power supply can retain said message data stored in said RAM after removal of said battery;

said decoder circuit comprises a count circuit for counting a time period elapsing from removal of a battery to insertion of a replacement battery detected by said battery removal/insertion detection circuit using a reference clock; and an operation circuit for reading said data retentive time from said ID-ROM, subtracting said elapsed time period from said data retentive time and outputting an operation result; and said CPU receives output information of said operation circuit on said LCD.

6. The radio selective call receiver of claim 5, wherein said CPU displays said remaining time only in minutes.

7. The radio selective call receiver of claim 5, wherein said CPU displays said remaining time both in minutes and seconds.

8. The radio selective call receiver of claim 5, wherein said CPU displays said remaining time only in minutes until a predetermined time and displays a subsequent time of said remaining time both in minutes and seconds.

9. A method of displaying a remaining data time allowed for replacing a battery of a radio selective call receiver for retaining message data stored in a RAM thereof, the method comprising the steps of:

presetting a retentive time allowed for retaining said message data stored in said RAM after removal of said battery, during which a backup power supply can retain said message data before said battery is replaced;

counting an elapsed time starting from when removal of said battery is detected;

subtracting said elapsed time from said retentive time to obtain a remaining time allowed for retaining said data; and displaying said remaining time.

10. The method of displaying a data retentive time of claim 9, wherein said remaining time is displayed only in minutes.

11. The method of displaying a data retentive time of claim 9, wherein said remaining time is displayed both in minutes and seconds.

12. The method of displaying a data retentive time of claim 9, wherein said remaining time is displayed only in minutes until a predetermined time and a subsequent time of said remaining time is displayed both in minutes and seconds.

13. A radio selective call receiver comprising:

a display;

a decoder circuit;

a low voltage detection circuit for detecting a condition that a voltage of a battery supplying power to each inner circuit declines below a predetermined reference voltage and notifying said decoder circuit of said detected condition;

a CPU for controlling display on said display in response to an instruction of said decoder circuit;

a battery removal/insertion detection circuit for detecting removal/insertion of a battery;

a memory for storing message data; and a backup power supply for supplying power to said memory when said battery has been removed, for retaining said message data in said memory;

wherein said decoder circuit receives a data retentive time allowed for retaining data stored in said memory after removal of said battery, during which said backup power supply can retain said message data in said memory;

said decoder circuit comprises a count circuit for counting a time period elapsing from removal of a battery to insertion of a replacement battery detected by said battery removal/insertion detection circuit using a reference clock, and an operation circuit for reading said data retentive time, subtracting said elapsed time period from said data retentive time and outputting an operation result; and said CPU receives output information of said operation circuit, edits said output information conforming to a remaining time allowed for retaining data before said battery is replaced and displays said remaining time on said display.

14. The radio selective call receiver of claim 13, wherein said CPU displays said remaining time only in minutes.

15. The radio selective call receiver of claim 13, wherein said CPU displays said remaining time both in minutes and seconds.

16. The radio selective call receiver of claim 13, wherein said CPU displays said remaining time only in minutes until a predetermined time and displays a subsequent time of said remaining time both in minutes and seconds.

* * * * *